Nov. 30, 1954  F. P. PRIESTLY  2,695,526
PHONOGRAPH DRIVE

Filed May 8, 1951  2 Sheets-Sheet 1

INVENTOR.
Frank P. Priestly
BY
J. W. Douglas
His Atty.

Nov. 30, 1954 F. P. PRIESTLY 2,695,526
PHONOGRAPH DRIVE
Filed May 8, 1951 2 Sheets-Sheet 2

INVENTOR.
Frank P. Priestly
BY
J. D. Douglass
His Atty.

United States Patent Office 2,695,526
Patented Nov. 30, 1954

2,695,526

PHONOGRAPH DRIVE

Frank P. Priestly, Park Ridge, Ill., assignor to Admiral Corporation, Chicago, Ill., a corporation of Delaware Application May 8, 1951, Serial No. 225,089

6 Claims. (Cl. 74—199)

This invention relates to drive mechanism by which a drivable member may be driven, from a constantly driven member, at a selected speed. More particularly the invention relates to phonograph mechanism comprising a turntable and a constantly driven shaft from which the turntable is operated at any one of a predetermined selection of speeds by novel drive mechanism, the selection being manually made by novel control means located at any position remote from the turntable and driven shaft.

Although drive mechanisms, for operating the turntable of a phonograph at a plurality of selectable speeds from a constantly driven motor are known to the prior art, they have often depended for their operation on cams to move one or more idlers axially or laterally thereof in order to vary the speed of the turntable. Levers and links have been additionally necessary to shift the cams from a point the position of which was limited to a considerable degree with respect to the turntable. In other drive mechanisms of the prior art, rocker beams have been employed to swing appropriate pulleys out of engagement with one rotary member and into engagement with other members. All of these mechanisms have been intricate and unduly subject to wear and maladjustment.

By the present invention a more simple and novel construction has been devised, since the necessity of using cams or rocker arms for shifting cams has been obviated. Also, control of the cams through intricate linkages has been replaced by flexible coupling means of a less expensive nature.

In the present improved mechanism a plurality of speed changer elements are employed. For operative support of the elements, use is made of a bushing already present for support of a driven shaft journalled therein to afford bearing support for a rotary carrier to which the elements are attached. Also, a flexible member, such as a cord or cable, is used to couple a manually operable control shaft to the carrier member so that rotation of the control shaft is adapted to be communicated to the carrier member for swinging one of the elements out of driving communication with the turntable and, concurrently, another of the elements into driving communication with the turntable. A floating idler biased into frictional driving relationship with a depending peripheral flange on the turntable usually is employed between the flange and element.

Other advantages of the invention will be apparent from the following specification when considered in conjunction with the accompanying drawings in which.

Figure 1:
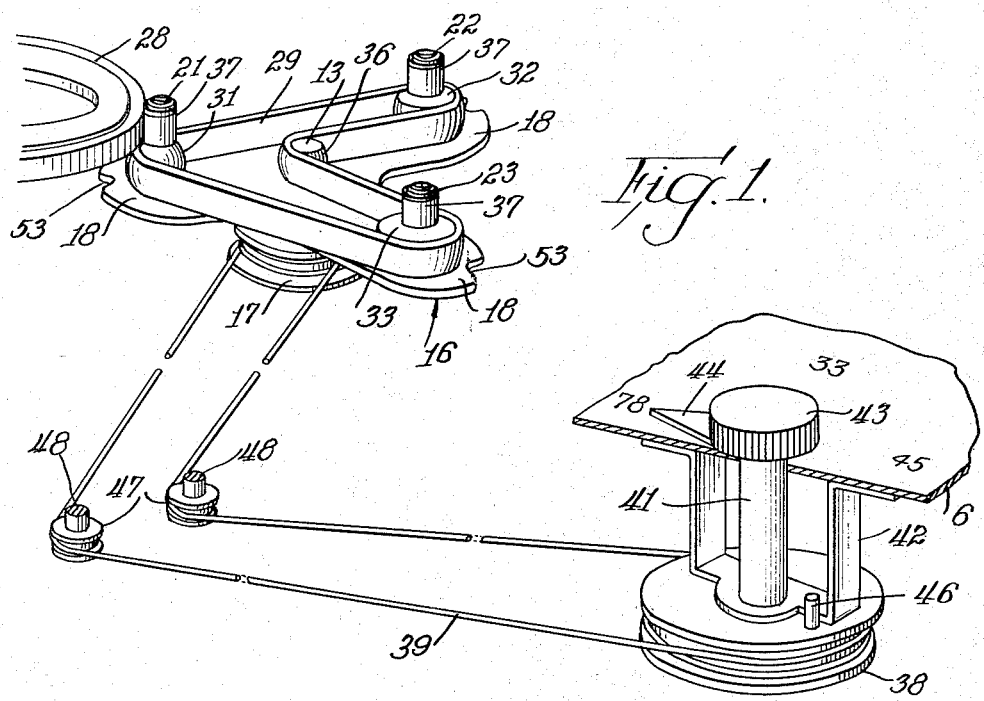
Fig. 1 is a fragmentary diagrammatic view of elements of a phonograph turntable drive mechanism in which the novel features are incorporated.
Figure 2:
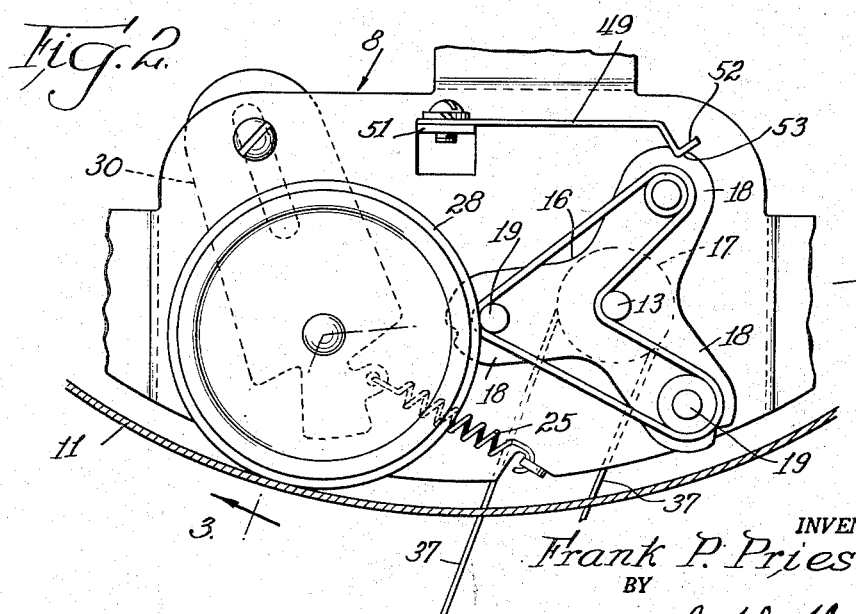
Fig. 2 is a fragmentary top plan view of a phonograph drive unit incorporating the inventive features.
Figure 3:
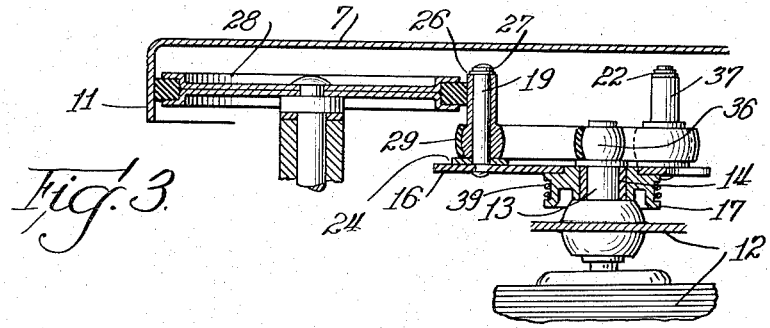
Fig. 3 is a fragmentary sectional view taken on line 3—3 of Fig. 2.

In the drawings, the reference character 6 is used to denote the base plate of a record player which supports, by means not shown, a conventional turntable 7 having a peripheral flange 11 extending downward. The base plate 6 also carries a motive unit 8 comprising a motor 12 of which a drive shaft 13 extends upward and is journalled in a stationary bushing 14 protruding from the motor. The bushing 14 extends beyond the shaft 13 and therefore is adapted to afford a bearing for a carrier member or spider 16 which rotates on the bushing. The member 16 may either be fixed to a pulley 17 or formed as a part thereof and is formed as a disc or star-shaped member having a plurality of arms 18. A pin 19 is fixed on each of the arms on an arc about the axis of shaft 13. The pins 19 each support a stepped pulley 21, 22 and 23 journalled on the pins. If desired, each of the pulleys 21, 22 and 23 may be spaced from the spider 16 by an antifriction washer 24, on the pins 19, and any suitable means may be provided to resist removal of the pulleys therefrom, such as washers 26 and C-washers 27. The pulleys 21, 22 and 23 are each adapted to be carried into frictional driving engagement with a resilient-surfaced floating idler 28 by rotation of the carrier plate 16. This idler is biased concurrently into frictional driving engagement with the turntable flange 11 by force of a tension spring 25, anchored to a slider 30 on which the idler is carried.

In the embodiment shown in Fig. 1, all of the pulleys 21, 22 and 23 are drivingly coupled to the shaft 13 by a single endless belt 29. The belt 29 passes over steps 31, 32 and 33, of dissimilar diameter on the pulleys 21, 22 and 23, and also over a drive surface 36 on the motor shaft 13. The steps 37 on the pulleys 21, 22 and 23 which engage the idler 28 may then be of equal diameter. Although this is a preferred arrangement, the belt 29 may pass over steps of common diameter and dissimilar sized steps then be provided to engage the idler 28. Thus the turntable 7 is adapted to be operated at three speeds, for example, 78 R. P. M., when the idler 28 is engaged by the pulley 21, 45 R. P. M. when the idler is engaged by the pulley 22, and 33⅓ R. P. M. when the idler is engaged by the pulley 23.

Novel control means is provided for rotating the carrier plate 16 to shift the pulleys 21, 22 and 23 alternately into driving position. This means comprises a sheave or flanged pulley 38 and the pulley 17 which, like pulley 38, is also flanged to accommodate a flexible member such as a cord or cable 39 without displacement thereof from the pulleys. The cord 39 is wrapped at least once completely around each of the pulleys 17 and 38 and at a point on the periphery, intermediate the extremities of the wrapped portions thereof, the cable is positively secured to each of the pulleys. This is a safety measure to prevent slippage of cable 39 with respect to either of the pulleys over which it passes. It may be carried out by pinching or knotting the cord about some protuberance at the periphery of each of the pulleys. The pulley 38 is fixed to a control shaft 41 which is journalled in a V-bracket 42 and the base plate 6. The shaft is supported from the base plate at any point which is convenient for its operation by a handle or knob 43 surmounting its upper end. The speed at which the turntable is operating may be determined from indicator means comprising a scale having suitable indicia, such as the numbers 78, 33 and 45, on the base plate 6 in arcuate relation to the shaft 41, and a pointer 44, on said shaft, adapted to be swung over the scale when handle 43 is turned.

A stop pin 46 on the pulley 38 is adapted to engage the bracket 42 and limits the rotation of the pulley 38. Such limitation may be necessary because the cord 39 is anchored to the pulley. It is apparent, however, that except for the use of a fixed cord, no limits are necessary. The limits are set to coincide with any two speeds of the turntable depending only on the arrangement of the pulleys 21, 22 and 23; and necessarily the third speed is intermediate the limits.

Because of the flexibility of the cable 39, it is not necessary that the control knob 43 and its pulley 38 be located on the base plate. It is envisioned, for example, that the knob may be mounted on the control panel of a radio record player along with controls for the radio receiving apparatus. Such an arrangement of the shaft 41 may involve inclining said shaft to some angle to the motor shaft 13 other than the angle shown. It may then be necessary to provide one or more pairs of sheaves 47 to guide the cable. The sheaves are rotatably supported on studs 48 fixed to any suitable, stationary part, so that the cable may clear elements of the record player or radio apparatus.

A retention means is provided to retain any one of the pulleys 21, 22 or 23 in releasable driving engagement with the idler 28. This means preferably includes a resilient leaf spring 49 supported above the motive unit 8 from a lug 51 thereon. The free end portion of spring 49 is hook-shaped to provide a protruding portion 52 adapted to engage a notch 53 in each of the spider arms 18. When the knob 43 is turned, the spider 16 is moved momentarily against the resistance of spring 49 until the portion 52 disengages from the notch 53 and again against the resistance of the spring as the next arm 18 approaches until the notch in that arm is retentively engaged.

Figure 4:
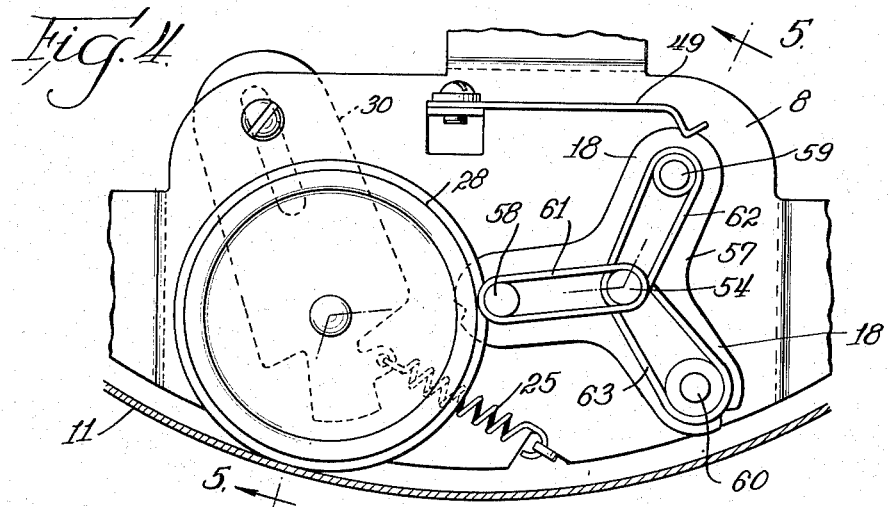
Fig. 4 is a fragmentary top plan view of a second embodiment of the invention.
Figure 5:
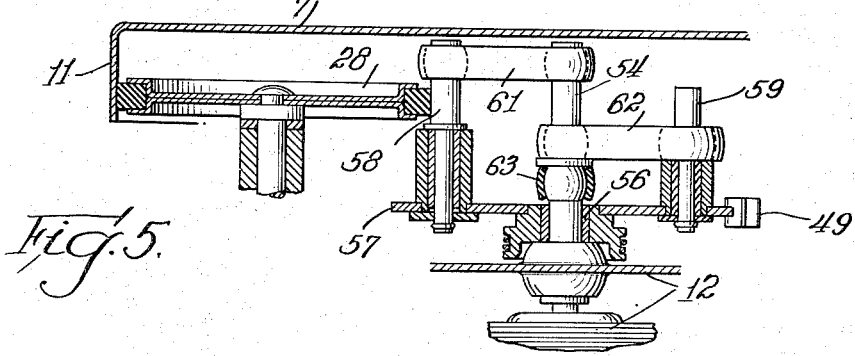
Fig. 5 is a fragmentary sectional view on line 5—5 of Fig. 4.

A second embodiment of the invention is illustrated in Figs. 4 and 5. Therein, a shaft 54, the counterpart of shaft 13, is journalled in a motor bushing 56. The bushing 56 also affords bearing support for a spider 57, similar to the spider 16. The spider 57 supports a plurality of idlers 58, 59 and 60 which correspond to the idlers 21, 22 and 23 and are also adapted to be carried into engagement with the floating idler 28 by rotation of the spider 57. The length of the idlers in the alternative embodiment is greater, as is also shaft 54, than the corresponding parts in the construction first described for the purpose of coupling the idlers to the shaft 54 in a manner somewhat different from the prior described device.

As shown, separate endless belts 61, 62 and 63 are looped about shaft 54, in side-by-side relationship to each other, the belt 61 also passing over pulley 58, belt 62 passing over pulley 59 and the belt 63 passing over pulley 60. This acomplishes the same purpose as the single belt 29 of the preferred embodiment, and the function of the two devices is exactly similar.

Although the invention has been described in two embodiments thereof, I am aware that numerous and extensive departures may be made therefrom without departing from the spirit or scope of my invention.

I claim:

1. In a record player including a drivable member and a motor having a constantly driven shaft in extension therefrom, in combination, means to operate the drivable member at one of a plurality of speeds from the constantly driven shaft comprising a bushing on the motor and in extension along the shaft, carrier means journalled on the bushing, a plurality of rotating elements supported from said carrier means, separate driving portions in connection with each of said elements, one of the driving portions of each of the elements being of common diametrical size and the remtaining portions differing in diametrical size, coupling means drivingly coupling corresponding portions of the elements to the driven shaft, the remaining portions being adapted to be severally carried into driving communication with the drivable member by rotation of said carrier means, and resilient retention means cooperatively associated with said carrier to releasably retain any one of said elements in operative engagement with said drivable member when so positioned.

2. A drive for a record player including a frame for support of a drivable member and a motive unit, the motive unit including a constantly driven shaft and a bearing therefor, means to operate the drivable member at one of a plurality of speeds from the shaft comprising carrier means rotatably supported by the bearing, a plurality of rotating elements carried by the carrier means, all of the elements having a driving portion of common diameter and each of said elements having another portion differing in diameter from the corresponding portions of the other elements, flexible means in engagement with corresponding portions of the elements and with the driven shaft to engage said elements in driven relationship to said shaft, the portions of said elements not engaged by said flexible means being adapted to engage said drivable member, said carrier means being movable to carry alternate elements into driving engagement with said drivable member thereby causing said member to be driven at different speeds, a rotatable shaft supported from the frame in remote relationship to the carrier means, a first coupling member fixed to said carrier means, a second coupling member fixed to the rotatable shaft, interconnecting means connected to both of the coupling members to transmit motion of the rotatable shaft to the carrier means for selectively varying the speed of the drivable member, and indicator means in connection with said rotatable shaft to indicate the speed selected.

3. In an automatic record player including a frame for support of a turntable and a motive unit, the motive unit including a constantly driven shaft and a bearing therefor, the combination of, means to operate the turntable at one of a plurality of speeds from the shaft comprising a spring-pressed idler to drivingly engage the turntable, carrier means rotatably supported by said bearing, a plurality of pulley elements carried by the carrier means, all of the elements having a driving portion of common diameter and each of said elements having another portion differing in diameter from the corresponding portions of the other pulley elements, separate belt means in driving engagement with each corresponding portion of the elements and the driven shaft by which said elements are in driven relationship to said shaft, the portion of said pulley elements being adapted to be carried into driving relationship with said idler alternately by movement of the carrier means thereby providing a different speed for the drivable member, an adjustment shaft supported from the frame in remote relationship to the carrier means, a handle on the adjustment shaft by which said shaft is adapted to be turned, a first coupling member fixed to said carrier means, a second coupling member fixed to the adjustment shaft, flexible interconnecting means connected to both of the coupling members by which motion of the adjustment shaft is communicated to the carrier means for interchange of said pulley elements, and indicating means including calibration indicia and a pointer in association with the adjustment shaft by which a selection of speeds is adapted to be determined.

4. In an automatic record player including a frame for support of a turntable and a motive unit, the motive unit including a constantly driven shaft and a bearing therefor and a drivable member, the combination of, means to operate the drivable member at one of a plurality of speeds from the shaft comprising a spider having a plurality of radial arms and rotatably supported by said bearing, a pulley element carried at the end of each of the arms, each of the elements having a driving portion of common diameter and another portion differing in diameter from the corresponding portions of the other pulley elements, flexible belt means in driving engagement with corresponding portions of the elements and with the driven shaft by which said elements are driven by said shaft, the portions of said elements not engaged by said belt means being adapted to be carried into driving engagement with said drivable member by rotation of the carrier means thereby providing a different speed for the drivable member, resilient retention means in association with the spider and frame to releasably retain any of said elements in engagement with the drivable member, an adjustment shaft supported from the frame in remote relationship to the spider, a handle on the adjustment shaft by which it is adapted to be turned, a first coupling member fixed to said spider, a second coupling member fixed to the manually movable shaft, flexible interconnecting means connected to both of the coupling members adapted to transmit turning motion of the adjustment shaft to the spider for selectively varying the speed of the drivable member, calibration indicia on the frame, and a pointer on the shaft cooperable with the calibrations by which the selected turntable speed is adapted to be determined.

5. A motor drive unit for a record player turntable having a rim for driven engagement by the drive unit, including a supporting frame, an idler for frictional engagement with the turntable rim, bracket means for rotatably supporting said idler, and means pivotally mounting said bracket on said frame arranged for limited sliding movement of the bracket, a motor drive shaft, spider means concentrically mounted relative to the drive shaft and having radially extending arms with idler driving means supported thereon near their ends, and means connecting the motor shaft to the idler driving means, resilient means connected between the bracket and the frame for resiliently urging the bracket toward but spaced from the turntable drive rim, means for holding said spider arms with a selected one of the idler driving means in the path of travel of the idler and engageable with the idler to drive and deflect the idler into contact with the turntable rim.

6. A motor drive unit for a record player turntable having a rim for driven engagement by the drive unit, including a supporting frame, an idler for frictional driving engagement with the turntable rim, bracket means for rotatably supporting said idler, and means pivotally mounting said bracket on said frame arranged for limited sliding movement of the bracket, a motor drive shaft, and spider means concentrically mounted relative to the drive shaft and having radially extending arms, idler driving means rotatably supported thereon, and each comprising a base of different diameter from the other, and belt means connecting the motor shaft to the bases of the idler driving means, resilient means connected to an end of the bracket remote from its support for resiliently urging the bracket toward but spaced from the turntable drive rim, index means engageable with said spider arms to hold the arms in predetermined fixed position with a selected one of the driving means in the path of travel of the idler and engageable with the idler to drive the idler and deflect the idler in driving contact with the turntable rim.

References Cited in the file of this patent

UNITED STATES PATENTS

| Number | Name | Date |
|---|---|---|
| 1,049,883 | Lord | Jan. 7, 1913 |
| 1,591,494 | Lanchester | July 6, 1926 |
| 2,518,769 | Gay | Aug. 15, 1950 |
| 2,660,896 | Hartman | Dec. 1, 1953 |

FOREIGN PATENTS

| Number | Country | Date |
|---|---|---|
| 481,931 | France | Nov. 7, 1916 |
| 554,369 | France | Feb. 28, 1923 |